United States Patent [19]

Dockrill et al.

[11] Patent Number: 5,035,936
[45] Date of Patent: Jul. 30, 1991

[54] LOOSE FILL INSULATION PRODUCT COMPRISING MINERAL WOOL NODULES

[75] Inventors: Mark B. Dockrill, Clearwater; John Buckham, Byron; Anthony P. Shen, Sarnia, all of Canada

[73] Assignee: Fiberglas Canada Inc., Point Edward, Canada

[21] Appl. No.: 551,241

[22] Filed: Jul. 10, 1990

Related U.S. Application Data

[62] Division of Ser. No. 307,495, Feb. 8, 1989.

[51] Int. Cl.$^5$ .................. E04B 1/62; F16L 59/00; F16L 59/04
[52] U.S. Cl. .................. 428/96; 156/71; 428/360; 428/361
[58] Field of Search ............ 427/220; 428/96, 360, 428/361

[56] References Cited

U.S. PATENT DOCUMENTS

| | | | |
|---|---|---|---|
| 2,233,433 | 3/1941 | Smith | 427/215 |
| 3,014,872 | 7/1975 | Scott | 252/62 |
| 3,894,314 | 7/1975 | Nayba | 427/212 |
| 4,418,103 | 11/1983 | Toni et al. | 428/360 |
| 4,542,044 | 9/1985 | Gano et al. | 427/215 |
| 4,820,574 | 4/1989 | Tesch | 428/362 |

*Primary Examiner*—James C. Cannon
*Attorney, Agent, or Firm*—Dennison, Meserole, Pollack & Scheiner

[57] ABSTRACT

A nodulizing machine for use in an apparatus for making loose fill insulation from mineral fibers comprises an input portal, a conduit containing a plurality of blades and an output portal. Apparatus for making loose fill insulation from mineral fibers comprises a duct extending from a source of the mineral fibers to the nodulizing machine of the present invention. The apparatus includes flow rate control means to control the flow rate of air and mineral fibers in the apparatus. A process for making loose fill insulation from mineral fibers in association with the apparatus of the invention is also discussed.

4 Claims, 2 Drawing Sheets

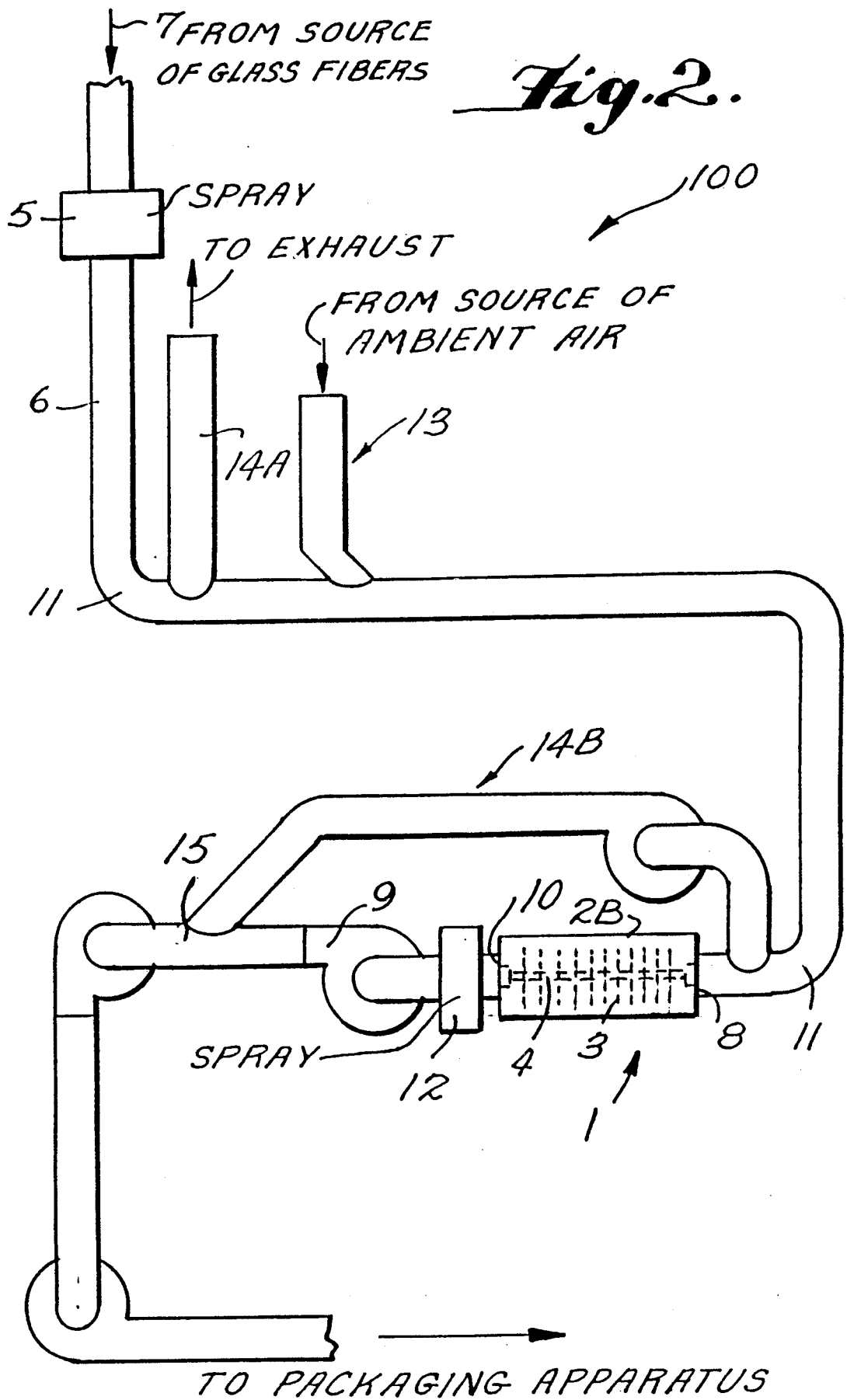

LOOSE FILL INSULATION PRODUCT COMPRISING MINERAL WOOL NODULES

This is a divisional of co-pending application Ser. No. 307,495 filed on Feb. 8, 1989.

BACKGROUND OF THE INVENTION

1. Field of the Invention

This invention relates to the manufacture of loose fill insulation products from mineral fibers.

More specifically, the invention relates to a nodulizing machine for use in an apparatus for making loose fill insulation from mineral fibers. The invention also relates to the apparatus with which the nodulizing machine is used, to a process for using the apparatus, to the use of said apparatus and to products of the use thereof.

2. Description of Related Art

Prior art loose fill insulation products and methods of making such products involve the expansion of individual pieces of feed stock, which may be, for example perlite or silicate, by means of, for example, heating. As well, the production of loose fill insulation by feeding insulation batting of mineral fibers through hammermills, Forberg mills or shredders is also known.

SUMMARY OF THE INVENTION

In contrast, the present invention teaches a loose fill insulation product and an apparatus and process for making the same, including the steps of reducing and controlling air flow, adding water to the feed stock, thereby continuously decreasing the temperature in the apparatus, and thereafter cutting and tumbling individual pieces of feed stock to produce a loose fill insulation product which comprises nodules of individual pieces, or parts thereof, of feed stock. By contact with one another in that process the individual nodules of mineral fibers are rounded.

The thermal performance of the loose fill insulation product of the present invention has been found to be greater than 18.5 RSI/m at a density of 12.8 kilograms per cubic meter. To achieve this thermal performance, the particle size may have a projected mean area of less than 12 mm$^2$ and a corresponding standard deviation of less than 11 mm$^2$ and the equivalent fiber diameter distribution or average fiber diameter is 6 microns using ASTM D 1282. The optical density of nodules of mineral fibers of the present invention are, on a linear scale ranging from 0 to 1000, less than 500 with a standard deviation of less than 150.

As is known to those skilled in the art, using a hammer mill on insulation batting of mineral fibers results in increased density of the core of each nodule, with little variation of the density of the outer portions of each nodule. As is also known to those skilled in the art, the mineral fibers of loose fill insulation products serve to retain air and it is such air that acts as the thermal insulator. Consequently, it is also known to those skilled in the art that the smaller the fiber diameters, the better the thermal performance of insulation made from such fibers. However, as those skilled in the art know, as desired fiber diameter decreases the difficulties of producing those fibers increase. Therefore, by not subjecting the mineral fiber feedstock to a device such as a hammer mill, which compresses the fibers, fibers of larger diameter may be used pursuant to the present invention to achieve thermal performance at much lower product density than is generally obtained by prior art loose fill insulation products at equivalent average fiber diameters. Moreover, the nodules of mineral fibers of the loose fill insulation product of the present invention have good uniformity, which, in turn, enhances the packing characteristics of the installed insulation.

Accordingly, the present invention provides a nodulizing machine for use in an apparatus for making loose fill insulation from mineral fibers, comprising an input portal, a conduit containing a plurality of blades and an output portal.

According to a further aspect of the present invention there is provided an apparatus for making loose fill insulation from mineral fibers, comprising a duct extending from a source of said mineral fibers to a nodulizing machine, a nodulizing machine and flow rate control means to control the flow rate of air and mineral fibers in said apparatus.

In accordance with the present invention a process for making loose-fill insulation from mineral fibers, comprises using flow rate control means to feed the fibers from a fiber source, through a duct and to a first spray apparatus, spraying a lubricity-cooling agent from the first spray apparatus onto said mineral fibers, using the flow rate control means to convey the mineral fibers subjected to the spraying to a nodulizing machine, wherein the mineral fibers are cut and tumbled to form nodules of mineral fibers by contact with a plurality of blades of the nodulizing machine, and by rubbing upon each other as they are conveyed radially, circumferentially and axially through the nodulizing machine from its input portal to its output portal by use of the flow rate control means.

In accordance with the present invention there is also provided a loose fill insulation product comprising nodules of mineral fibers.

BRIEF DESCRIPTION OF THE DRAWINGS

Embodiments of the present invention will now be described with reference to the accompanying drawings, in which:

FIG. 1 is an elevation view of an embodiment of the nodulizing machine of the present invention and FIG. 2 is a schematic view of an embodiment of the apparatus of the present invention.

DESCRIPTION OF THE PREFERRED EMBODIMENTS

Figure 1:
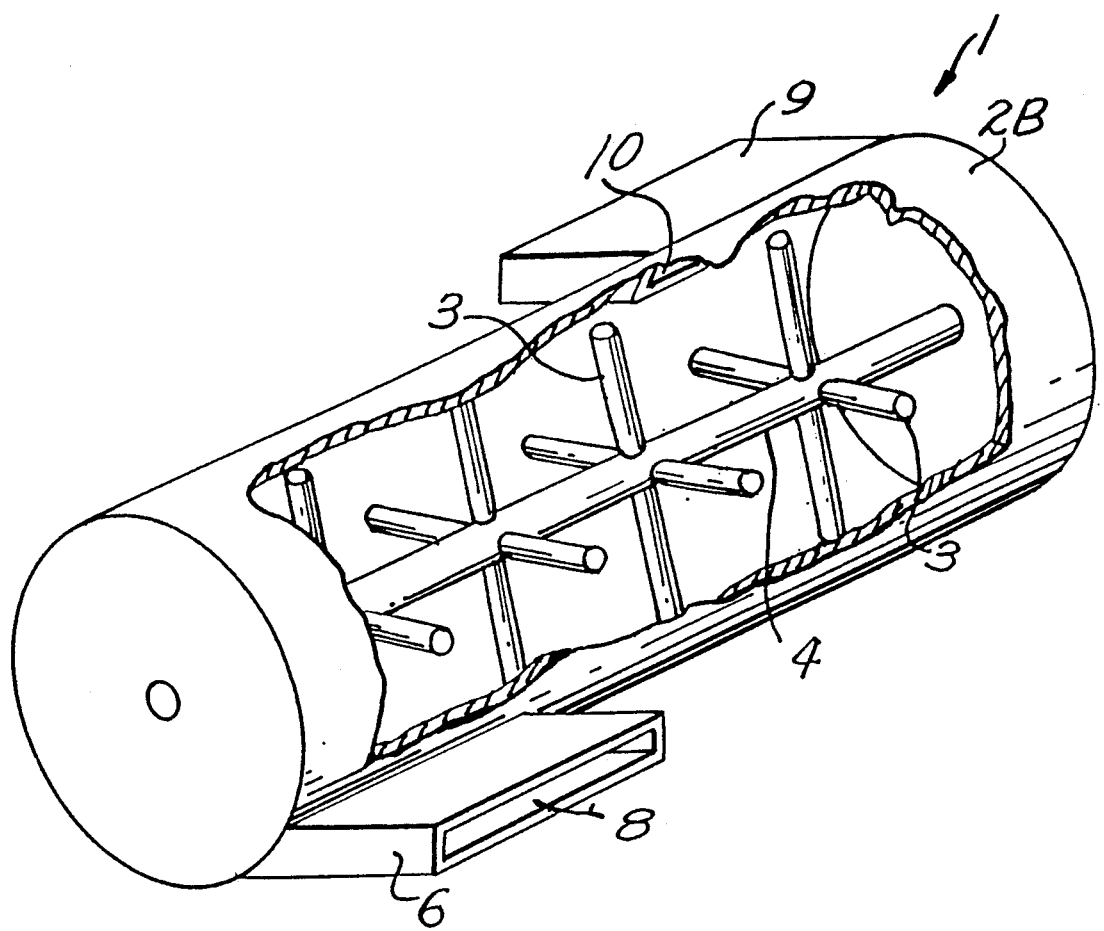

The nodulizing machine 1 of the present invention may further comprise blade motion control means 2A Such blade motion control means 2A, such as a variable-speed motor in V-belt drive, are capable of rotating the shaft 4 to which the blades 3 are rigidly or pivotably connected. Pivotable connection as between the shaft 4 and each blade of the plurality of blades 3 is a means, in addition to varying the speed of the motor, to control the throughput of feedstock and output of nodules. Such control is desirable in the event of a sudden increase in the input flow rate of feedstock into the nodulizing machine.

The apparatus 100 of the present invention may further comprise a first spray means 5 located between walls of the duct 6, (which passes from the source (not shown) of the mineral fibers to the nodulizing machine 1) between the input portal 7 of the duct 6 and the input portal 8 of the nodulizing machine 1. The first spray means 5 is purposed to spray a lubricity-cooling agent, such as a water-silicone oil emulsion, onto the mineral fibers. (In order to facilitate the transport of nodules of mineral fibers from the nodulizing machine 1 to a packaging apparatus (not shown), the apparatus 100 may further comprise a pneumatic conveying line 9 directed outwardly from the output portal 10 to the nodulizing machine 1.)

In order to facilitate reduction of air flow rate in the nodulizing machine 1 at least one degassification elbow 11 of a plurality of degassification elbows may be included in the flow rate control means of the apparatus 100. Details of the construction and use of each such degassification elbow 11 are disclosed in a co-pending U.S. patent application Ser. No. 307,520, now U.S. Pat. No. 4,971,604 filed concurrently herewith the disclosure of which is incorporated herein by reference. As well, an ambient air input means 13 may be between the exhaust conduit means 14A of the first degassification elbow 11 and the second degassification elbow, which may be disposed between that ambient air input means 13 and the input portal 8 of the nodulizing machine 1. Preferably, each degassification elbow 11 and ambient air input means 13 is part of the duct 6 (extending from a source (not shown) of mineral fibers to the nodulizing machine 1) and is located between the first spray apparatus 5 and the nodulizing machine 1. The exhaust conduit means 14 of each degassification elbow 11 ma be connected to the pneumatic conveying line 9 at one or more re-entry portals 15 to facilitate the transfer of nodules of mineral fibers from the nodulizing machine to a packaging apparatus (not shown).

The apparatus 100 may further comprise a second spray apparatus 12 directed between the walls of the above-mentioned pneumatic conveying line 9 and capable of spraying onto the nodules of mineral fibers an agent which, when applied to the nodules of mineral fibers, is capable of retaining mineral dust. Mineral oil is an example of such a dust retention agent.

Water-silicone oil emulsion comprises an example of the lubricity-cooling agent referred to above respecting the process of the present invention. The flow rate control means used in the process of the present invention may include a plurality of degassification elbows 1 (disclosed in the abovementioned co-pending U.S. patent application) and a cool air input means Each such degassification elbow 11 and cool air input means 13 is preferably located downstream from the first spray apparatus 5 and upstream from the nodulizing machine The process of the present invention may include two further steps. The first step comprises conveying the nodules of mineral fibers from the output portal 10 of the nodulizing machine to a second spray apparatus 12, which is capable of spraying onto the nodules of mineral fibers an agent which when applied to the nodules of mineral fibers is capable of retaining mineral dust. The second further step is the spraying of mineral dust retaining agent onto the nodules of mineral fibers. A pneumatic conveying line 9 downstream from the nodulizing machine 1 is an example of a means which may be used according to the process of the present invention for conveying the nodules of mineral fibers in the above-mentioned first further step. Mineral oil comprises an example of the above-mentioned mineral dust retaining agent.

The rates and quantities of flows of air and of fibers into the apparatus 100 and thence into the nodulizing machine 1, together with the rate of rotation of the shaft 3, determine the residence time of the fibers in the nodulizing machine 1 and hence determine the size, shape and thermal performance of the nodules of mineral fibers produced.

Surfaces of the nodules of mineral fibers of the loose fill insulation product of the present invention may bear an agent capable of retaining mineral dust. Mineral oil comprises an example of an agent capable of retaining mineral dust.

It will be obvious to those skilled in the art that the scope of the present invention is not restricted to the embodiments disclosed above and may be varied within the scope of the following claims without departing from the spirit and scope of the invention.

I claim:

1. A loose fill insulation product comprising mineral wool nodules and produced by a process comprising the steps of:

spraying a lubrication-cooling agent onto a flow of discrete mineral wool fibers;

pneumatically conveying the sprayed fibers at a controlled rate into a nodulizing means, said rate being controlled by conveying the sprayed fibers through at least a first degassification elbow;

cutting and tumbling the fibers into nodules in the nodulizing means by contact with a plurality of blades rotating at a controlled speed and by rubbing upon each other as the fibers travel radially, circumferentially and axially through said nodulizing means; and pneumatically conveying the nodules from said nodulizing means, said nodules having a thermal performance of at least 18.5 RSI/m at a density of 12.8 kg/m$^3$ and a particle size having a projected means area of less than 12 mm$^2$, with a corresponding standard deviation of less than 11 mm$^2$.

2. A loose fill insulation product as claimed in claim 1, wherein the optical density of said nodules is, on a linear scale ranging from 0 to 1000, less than 500, with a corresponding standard deviation of less than 150.

3. A loose fill insulation product as claimed in claim 1, wherein said nodules of mineral fibers have surfaces bearing an agent capable of retaining mineral dust.

4. A loose fill insulation product as claimed in claim 3, wherein said agent comprises mineral oil.

* * * * *